United States Patent
Frey et al.

[15] 3,674,787

[45] July 4, 1972

[54] 2-(α-MORPHOLINOBENZYL)-ANILIDES

[72] Inventors: Hans-Hasso Frey, Soborg; Sven Liisberg, Vedbaek, both of Denmark

[73] Assignee: Lovens kemiske Fabrik Produktionsaktieselskab, Ballerup, Denmark

[22] Filed: March 10, 1969

[21] Appl. No.: 805,856

[30] Foreign Application Priority Data

March 14, 1968 Great Britain......................12,494/68

[52] U.S. Cl. ...............260/247.2 A, 260/251 Q, 260/244 R, 424/248

[51] Int. Cl. ......................................................C07d 87/42
[58] Field of Search..............................................260/247.2

Primary Examiner—Alex Mazel
Assistant Examiner—Jose Tovar
Attorney—Stowell & Stowell

[57] ABSTRACT

This invention relates to pharmaceutically active 2-(α-morpholinobenzyl)-anilides intended for use as tranquilizers having, e.g., an anticonvulsive, muscle-relaxing, or sedative effect, to salts of the said anilides, and to pharmaceutical preparations in dosage unit form, containing from 5 mg to 250 mg of the said anilides or salts per dose.

9 Claims, No Drawings

2-(α-MORPHOLINOBENZYL)-ANILIDES

This invention relates to novel 2-(α-morpholinobenzyl)-anilides of the general formula

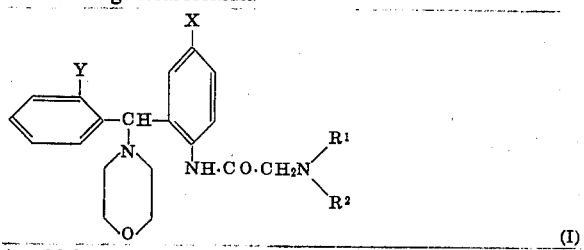

in which X and Y are the same or different substituents, each of which represents hydrogen, halogen, preferably chlorine, bromine, or fluorine, a halo-alkyl radical, such as a trifluoromethyl group, or a nitro group; $R^1$ and $R^2$ are the same or different substituents, each representing hydrogen, an unsubstituted or substituted aliphatic radical, a cyclo-aliphatic radical, an aminoacyl radical, or $R^1$ and $R^2$ together with the nitrogen atom form a saturated or unsaturated heterocyclic ring system having from three to seven ring atoms and containing one or more hetero atoms, which heterocyclic rings may be substituted with a lower alkyl group.

Thus, when representing an aliphatic radical, each of $R^1$ and $R^2$ may be saturated or unsaturated, straight or branched aliphatic radical, which optionally can be substituted with one or more hydroxy groups, alkoxy groups, dialkylamino groups, monocyclic carboxylic aryl groups, or heterocyclic groups.

In particular, each of $R^1$ and $R^2$ may be an alkyl radical, such as methyl, ethyl, propyl, isopropyl, butyl, sec.butyl, pentyl, hexyl, or heptyl, an alkenyl radical, such as vinyl, allyl, or butenyl, or an alkynyl radical, e.g., propargyl.

As examples of substituted aliphatic radicals can be mentioned hydroxy-alkyl radicals, e.g., hydroxy-ethyl, hydroxy-propyl, and β-hydroxy-α,α-dimethyl-ethyl radicals, alkoxy-alkyl radicals, e.g., methoxy-ethyl, β-methoxy-propyl, γ-methoxy-propyl, ethoxy-ethyl, diethoxy-ethyl, and ethoxy-propyl radicals, dialkylaminoalkyl radicals, e.g., dimethylaminoethyl and diethylaminoethyl radicals, monocyclic carbocyclic aralkyl or aralkenyl radicals wherein the aryl part of the radical optionally may be substituted with halogen or lower alkyl, e.g., benzyl, o-, m-, or p-halo-benzyl, α-phenylethyl, β-phenylethyl, o-, m-, or p-tolyl-methyl, phenylpropyl, styryl and cinnamyl radicals. As examples of aliphatic radicals substituted with heterocyclic groups, 2- or 3-furylmethyl, tetrahydrofurylmethyl, pyridylmethyl, piperidylmethyl, and thienylmethyl can be mentioned.

In particular, a cyclo-aliphatic radical may be a cycloalkyl, or cycloalkenyl radical having preferably from five to seven ring carbon atoms, e.g., cyclopentyl, cyclohexyl, cycloheptyl, cyclopentenyl, cyclohexenyl, or cycloalkyl-alkyl, cyclo-alkenyl-alkyl, or cycloalkyl-alkenyl radicals, e.g. cyclopentylmethyl, cyclohexylethyl, cyclohexenylmethyl, cyclohexylallyl, and other similar radicals.

As examples of aminoacyl radicals, aminoacetyl and α- and β-aminopropionyl radicals can be mentioned.

When $R^1$ and $R^2$ together with the nitrogen atom form a heterocyclic ring system, this can be unsubstituted or substituted and may contain other hetero atoms, such as another nitrogen atom, an oxygen atom or a sulphur atom, e.g., the piperidinyl, γ-methylpiperidinyl, piperazinyl, N-methylpiperazinyl, pyrrolidinyl, α- or β-methylpyrrolidinyl, azirinyl, morpholinyl, thiazinyl, imidazolinyl and pyrazolyl radicals.

The invention also relates to salts of the anilides of formula I with pharmaceutically acceptable acids, such as inorganic acids, e.g., hydrochloric acid, nitric acid, sulphuric acid, and phosphoric acid, and organic acids, e.g., acetic acid, maleic acid, tartaric acid, and citric acid.

Due to the asymmetric carbon atom in the compounds of the invention, these exist in epimeric forms, and the invention comprises the epimeric forms as well as mixtures thereof.

The present compounds have strong pharmacological effects. The anticonvulsive effect is the dominating, and these compounds are outstanding in having a very long-lasting effect. The effect as anticonvulsants is shown against pentetrazole-induced seizures in mice. In this test, most of the present compounds have a strength exceeding that of phenobarbital, and they are much more active than for example trimethadione or ethosuximide, both of which are in use for treatment of epilepsy. The toxicity of the present compounds is very low.

The compounds of formula I are well tolerated substances which may be administered enterally, e.g., orally, as well as parenterally either as such or in the form of a salt in any of the known forms of pharmaceutical preparations which contain the active compound in admixture with pharmaceutical carriers and other auxiliary substances. Such preparations may also contain, in combination, other therapeutically active substances.

In such preparations, the proportion of therapeutically active material to carrier substance and auxiliary agent can vary between 1 and 95 percent. The composition can either be worked up to pharmaceutical preparations in solid form, such as tablets, pills, dragees, capsules or suppositories, or in liquid form, such as pharmaceutically acceptable solutions, mixtures, emulsions, or suspensions. Pharmaceutical organic or inorganic solid or liquid carriers suitable for oral, enteral or topical administration can be used to make up the composition. Gelatine, lactose, starch, magnesium stearate, talc, vegetable and animal fats and oils, gums, polyalkylene glycol, and other known carriers for medicaments are all suitable as carriers. The auxiliary agents can be buffers, emulsifying, stabilizing, and preserving substances.

Furthermore, the compositions may contain other therapeutically active components which appropriately can be administered together with the compound of the invention, such as other central-depressiva or anti-secretory agents.

Another object of the invention resides in the selection of a dose of the compounds of the invention and their salts which can be administered so that the desired activity is achieved without simultaneous secondary effects.

The compounds are conveniently administered in dosage units containing not less of the active substance than corresponding to 1 mg and not more than corresponding to 0.5 g of the 2(α-morpholino-2'-Y-benzyl)-4-X-aminoacetanilide in question and preferably to from 5 mg to 250 mg. By the term "dosage unit" is meant a unitary, e.g., a single dose capable of being administered to a patient, and which may be readily handled and packed, remaining as a physically stable unit dose, comprising either the active material as such or a mixture of it with a solid pharmaceutical carrier.

In the form of a dosage unit, the compound may be administered once or more times a day at appropriate intervals, always depending, however, on the condition of the patient. Thus a daily dose will preferably amount to from 20 mg to 500 mg of the compound of the invention.

As an example of a dosage unit in which the anticonvulsive effect is the predominant factor, the 2-(α-morpholino-2'-fluorobenzyl)-4-nitro-ω-allylamino-acetanilide can be mentioned when prepared as capsules or tablets in an amount of 10 mg active substance in one dose. Likewise the 2-(α-morpholino-2'-fluorobenzyl)-4-chloro-aminoacetanilide may be used in a dose containing 10 mg of the active substance especially as a sedative.

The invention also relates to the preparation of the compounds of formula I. One method comprises reacting a compound of the formula:

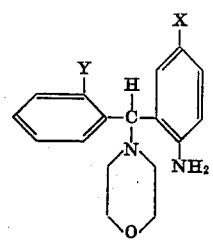

wherein X and Y have the same meaning as above, with a haloacetyl halide, for instance a bromo-acetyl bromide or chloride, in the presence of pyridine and an inert organic solvent, e.g., chloroform, and at room temperature, followed by a treatment with ammonia, or with a primary or secondary amine, if necessary under cooling to room temperature.

Alternatively, a compound of formula I can be prepared from a compound of formula II in one step by a treatment with a mixed anhydride of an N,N-disubstituted aminoacetic acid and ethylcarbonic acid, in an inert organic solvent, preferably acetone, and at low temperatures.

In the case where $R^1$ and $R^2$ of formula I are both hydrogen, the compounds of the invention can also be prepared by reacting a compound of formula II with a phthaloylglycyl halide, for instance phthaloylglycyl chloride, in an organic solvent, such as pyridine, or pyridine mixed with pyridine, or another basic nitrogen-containing solvent, whereafter the phthaloylglycylanilide derivative formed can be cleaved by a hydrazinolysis.

The temperature, at which the reaction takes place, will generally be at the boiling point of the solvent used in the process, but depends on the substituents of the starting materials, and can also be accomplished at lower temperatures.

If desired, the compounds obtained by this process can be alkylated to form the mono- or di-alkylated compounds of formula I.

The starting compounds of formula II are new compounds, which to some degree have the same effect as the compounds of formula I and therefore also are within the scope of this invention.

The said starting compounds can be produced by well-known methods form the corresponding X,Y-disubstituted aminobenzophenones known from the literature. The reduction of some of these amino-benzophenones to the corresponding aminobenzhydrols is also known from the literature (J.pr.Chem.4.Rh. *36* (1967) 5), and can be accomplished by means of any reducing agent capable of reducing a keto group to a hydroxy group, but it is preferred to use a metal hydride, such as an alkali metal borohydride, especially sodium borohydride. The reaction is performed at room temperature or at slightly elevated temperature, but preferably below 40° C and in an organic solvent, for instance an alcohol. The reaction product can be precipitated by addition of water.

The aminobenzyhydrol compounds in the form of their hydrochlorides are subsequently treated with a chlorinating agent whereby the secondary hydroxy group will be replaced by a chlorine atom. Thionyl chloride or phosphorous pentachloride may be used as the chlorinating agent although others will be known to those skilled in the art. The solvent can be an anhydrous, low-boiling, inert organic solvent, such as ether or methylene chloride. The reaction produce may be isolated, or the reaction mixture may be treated directly with morpholine either at room temperature or by gentle heating, optionally in an inert organic solvent, whereafter the resulting compound of formula II can be isolated in known manner.

In an alternative method the starting materials of formula II can be prepared by an acidic or alkaline hydrolysis of the corresponding morpholinobenzyl benzoylanilines of formula III:

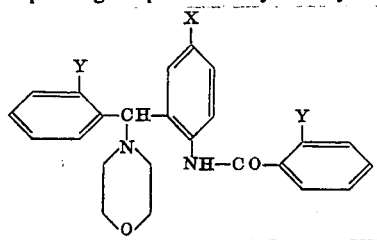

(III)

in which X and Y are as hereinbefore defined, and which can be prepared from the product formed by reacting an X-substituted aniline with a Y-substituted benzoyl halide according to a process described in Bull. Intern. Acad. Polonaise, Classe Sc. Math.nat. Serie A.*33* (1935). In the cited literature, the process is described for the compounds in which X is chlorine and Y is hydrogen, but the corresponding X,Y-disubstituted compounds can be made in analogous manner and can be represented by the following formula IV:

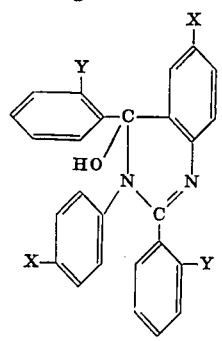

(IV)

in which X and Y are as defined hereinbefore. By a mild hydrolysis according to that described in the literature cited above, these compounds are decomposed into the X,Y-disubstituted benzoylaminobenzophenones of the formula V*a*:

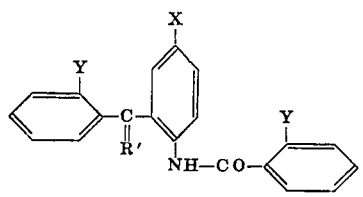

Va: R′=O

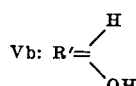
Vb: R′=
    H
    /
    \
     OH

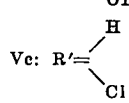
Vc: R′=
    H
    /
    \
     Cl

The hydrolysis is preferably carried out in an inert organic solvent, an aqueous organic solvent or in water, in the presence of an acid, preferably a strong acid, for instance hydrochloric acid, and at a temperature from room temperature up to the boiling point of the solvent.

By reduction with borohydrides, preferably alkali metal borohydrides, in an inert organic solvent, e.g., an alcohol or an aqueous alcohol and preferably at room temperature, a benzophenone derivative of formula V*a* can be converted into the corresponding N-(Y-benzoyl)-aminobenzhydrol of the formula V*b*.

By treating the compounds of formula V*b* with dehydrating agents, such as for example thionyl chloride, phosphorous pentachloride, borontrifluoride, and the like, the reaction product is either a benzhydryl chloride of formula V*c* or, depending of what X and Y stand for, a diphenylbenzoxazine of formula VI:

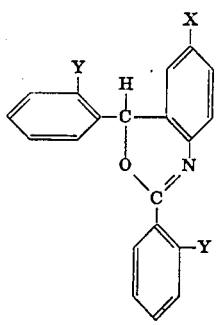

(VI)

in which X and Y are as hereinbefore defined. By reacting the compounds of formula V*c* or formula VI with morpholine, preferably by gentle heating up to the boiling point, the chlorine atom is split off or the oxazine ring is reopened to form the morpholinobenzyl-benzoyl-anilines of formula III.

In another method, a compound of formula I can be prepared by initially treating a X,Y-disubstituted aminobenzophenone with a halo-acetyl halide, such as bromoacetyl bromide or chloride in the presence of pyridine and another suitable solvent, followed by an amination. Both of these reactions are well known and described in the literature, and result in known compounds of formula VII below, in which $R^1$, $R^2$, X, and Y are as hereinbefore defined.

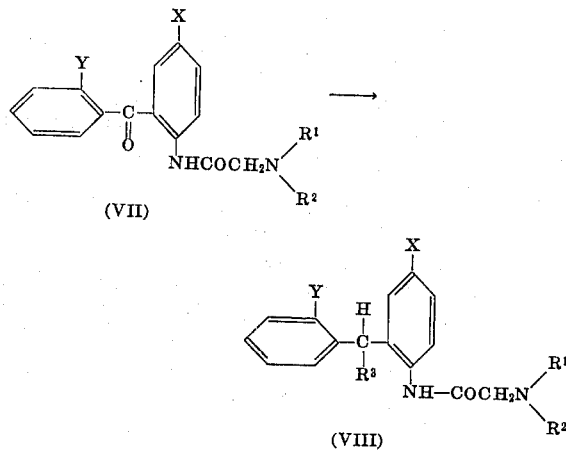

Reduction of the benzophenone of formula VII to the corresponding benzhydrol of formula VIII ($R^3$ = OH) can be accomplished by any of the reducing agents capable of reducing a keto group to a hydroxy group, but it is preferred to use a metal hydride, such as an alkali metal borohydride, especially sodium borohydride. The reaction conditions and the solvents used can be the same as already mentioned for the corresponding aminobenzophenones. The benzhydrol compounds of formula VII are thereafter treated with a halogenating agent, such as thionyl chloride or phosphorous pentachloride, whereby the secondary hydroxy group is replaced by a halogen atom and a halo-benzyl-amino acetanilide derivative of formula VIII ($R^3$ = halogen) is formed. In this halogenation process, if necessary, the $R^1R^2N$-group can be protected in different ways, for instance as the hydrochloride, and the reaction can be performed in different anhydrous, low-boiling, inert organic solvents, e.g., ether or ethylene chloride. The reaction temperature can be room temperature, but it is preferred to raise the temperature up to the reflux temperature of the reaction mixture. By treating the reaction products of formula VIII in which $R^3$ is halogen with morpholine at room temperature or by gentle heating, optionally in an inert organic solvent, the compounds of the invention can be obtained. Following another route the benzhydrol derivative can be treated with an alkyl- or arylsulphonyl halide, whereby an intermediate is formed in which $R^3$ is an alkyl- or arylsulphonyloxy group. By treating this intermediate with morpholine, the compounds of the invention can also be obtained.

Depending on the reaction conditions and the methods of isolation, the resulting products are obtained in the free state or in the form of a salt with an acid, from which the free compounds of formula I can be obtained using generally known methods. If one of the epimers of the starting materials is used in the above processes, the analogous epimeric form of the reaction product is obtained. If on the other hand a mixture of the epimeric forms is used in the above described processes of the invention, a mixture of the epimeric forms of the compounds of formula I will result and may thereafter be resolved in the epimeric forms by conventional methods, if desired.

The invention will now be illustrated by the following nonlimiting Examples:

EXAMPLE 1

2-(α-Morpholino-2'-chloro-benzyl)-4-nitro-ω-(β-methoxyethylamino)-acetanilide

A. To a suspension of sodium borohydride (2 g) in absolute ethanol (80 ml) was added 5-nitro-2'-chloro-2-aminobenzophenone while stirring. The mixture was left standing for 2 hours and was then acidified with dilute hydrochloric acid to a pH of about 3. The reaction product was precipitated by slow addition of water in small portions to the reaction mixture. After filtration and drying, the 5-nitro-2'-chloro-2-amino-benzhydrol was obtained with a melting point of 127°–128° C.

B. A suspension of 5-nitro-2'-chloro-2-amino-benzhydrol (7.5 g) in methylene chloride (100 ml) was saturated with dry hydrogen chloride gas. Two drops of pyridine and thereafter thionyl chloride (7.5 g) were added, and the mixture was refluxed for one hour and then evaporated to about 25 ml. The remaining solution was poured into a solution of morpholine (7.5 g) in methylene chloride (25 ml) under continuous stirring. The mixture was left for 2 hours at room temperature, when it was washed with water, dried over magnesium sulphate, and evaporated. The residue was dissolved in ether, the solution was treated with charcoal and filtered, and the etherial solution was evaporated to a minor volume to give crystalline 2-(α-morpholino-2'-chloro-benzyl)-4-nitro-aniline with a melting point of 137°–138° C.

C. 2-(α-Morpholino-2'-chloro-benzyl)-4-nitro-aniline (4 g) was dissolved in chloroform (50 ml). To the solution was added pyridine (4 ml) and, under continuous stirring and cooling, chloro-acetyl chloride (4 ml) was added dropwise. The reaction mixture was left for 1 hour. Then it was shaken with dilute hydrochloric acid and thereafter with dilute sodium carbonate solution. The organic phase was separated from the aqueous phase, dried over magnesium sulphate, and evaporated to dryness. The residue was recrystallized from ethanol to give 2-(α-morpholino-2'-chloro-benzyl)-4-nitro-ω-chloro-acetanilide with a melting point of 186°–187° C.

D. 2-(α-Morpholino-2'-chloro-benzyl)-4-nitro-ω-chloroacetanilide (2 g) was dissolved in methoxyethylamine (4 ml). When the exothermic reaction ceased, the reaction mixture was left at room temperature for one hour. Water was added, and the formed precipitate was sucked off, dried and recrystallized from ether to give 2-(α-morpholino-2'-chlorobenzyl)-4-nitro-ω-(β-methoxyethylamino)-acetanilide with a melting point of 132°–133° C.

By substituting ammonia, n-propylamine, or isopropylamine in equivalent amounts for the methoxyethylamine used in step D, the corresponding 2-(α-morpholino-2'-chlorobenzyl)-4-nitro-aminoacetanilide with a melting point of 233°–235° C, 2-(α-morpholino-2'-chloro-benzyl)-4-nitro-n-propylaminoacetanilide with a melting point of 157°–158° C, or 2-(α-morpholino-2'-chloro-benzyl)-4-nitro-isopropylaminoacetanilide with a melting point of 128°–219° C was obtained.

EXAMPLE 2

Following the procedure of Example 1, step A through D, but substituting 5-chloro-2'-fluoro-2-amino-benzophenone, 5-chloro-2-amino-benzophenone, 5-nitro-2'-fluoro-2-amino-benzophenone, 5-bromo-2-amino-benzophenone, or 5-nitro-2-amino-benzophenone for the 5-nitro-2'-chloro-2-amino-benzophenone of Example 1, the corresponding 2-(α-morpholino-2'-fluoro-benzyl)-4-chloro-ω-(β-methoxyethylamino)-acetanilide with a melting point of 107°–108° C, 2-(α-morpholinobenzyl)-4-chloro-ω-(β-methoxyethylamino)-acetanilide with a melting point of 121°–122° C, 2-(α -morpholino-2'-fluoro-benzyl)-4-nitro-ω-(β-methoxyethylamino)-acetanilide with a melting point of 134°–135° C, 2-(α-morpholinobenzyl)-4-bromo-ω-(β-methoxyethylamino)-acetanilide with a melting point of 114°–115° C, or 2-(α-morpholinobenzyl)-4-nitro-ω-(β-methoxyethylamino)-acetanilide with a melting point of 149°–150° C was obtained.

EXAMPLE 3

2-(α-Morpholinobenzyl)-4-nitro-aminoacetanilide

A. To a suspension of sodium borohydride (1 g) in ethanol (50 ml 96 percent) was slowly added 5-nitro-2-amino-benzophenone, while stirring. The stirring was continued for 2 hours whereafter 2N hydrochloric acid was added to a pH of 5 to 6. After filtration, water was added to the solution, whereby an oil separated. After standing, the oil crystallized. The crystals were filtered off and, after recrystallization from benzene, 2-(α-hydroxybenzyl)-4-nitro-aniline (4-nitro-2-amino-benzhydrol) was obtained as yellow crystals with a melting point of 121°–123° C.

B. 2-(α-Hydroxybenzyl)-4-nitro-aniline (4 g) was suspended in ethylene chloride (90 ml). The suspension was saturated with dry hydrogen chloride gas, whereby a yellowish acidic solution was obtained. Two drops of pyridine were added and thereafter thionyl chloride (3.9 g). The mixture was boiled for 1 hour and then evaporated. The residue was dissolved in methylene chloride (25 ml). The solution was cooled in an ice bath, and morpholine (3 ml) was slowly added. After standing overnight under continuous stirring, the solution was evaporated. The residue was dissolved in ether, the solution was washed twice with water, dried over magnesium sulphate and again evaporated. By recrystallization from ether, the 2-(α-morpholinobenzyl)-4-nitro-aniline was obtained with a melting point of 167°–169° C.

C. To a mixture of 2-(α-morpholinobenzyl)-4-nitro-aniline (3.9 g), pyridine (1 g) and benzene (20 ml) was added dropwise a solution of phthaloylglycyl chloride (2.8 g) in benzene (30 ml). The mixture was stirred for one hour at room temperature and then for 40 minutes at 60° C. The solvent was then evaporated, and the residue was partitioned between methylene chloride and water. The organic phases were combined, dried over magnesium sulphate, and the solvent was evaporated. The residue was crystallized from benzene to give 2-(αmorpholinobenzyl)-4-nitro-N-phthaloylglycyl-anilide with a melting point of 168°–169° C.

D. A suspension of 2-(α-morpholinobenzyl)-4-nitro-N-phthaloylglycyl-anilide (15.9 g), absolute ethanol (130 ml) and hydrazine hydrate (1.65 g) was stirred overnight at room temperature and then refluxed for 3 hours. To the hot mixture, dilute hydrochloric acid (25 ml, 4N) and water (50 ml) were added. After cooling, the mixture was filtered, and the filtrate was made alkaline with dilute sodium hydroxide, whereby the crude product precipitated. Recrystallization from benzene gave the 2-(α-morpholinobenzyl)-4-nitro-aminoacetanilide with a melting point of 207-208° C.

EXAMPLE 4

Following the procedure of Example 3, but substituting 5-chloro-2-amino-benzophenone, 5-chloro-2'-fluoro-2-amino-benzophenone, 5-nitro-2'-chloro-2-amino-benzophenone, or 5-bromo-2-amino-benzophenone for the 5-nitro-2- amino-benzophenone, the corresponding 2-(α-morpholinobenzyl)-4-chloro-aminoacetanilide with a melting point of 151°–152° C, 2-(α-morpholino-2'-fluoro-benzyl)-4-chloroaminoacetanilide with a melting point of 134°–136° C, 2-(α-morpholino-2'-chloro-benzyl)-4-nitro-aminoacetanilide with a melting point of 233°–235° C, or 2-(α-morpholinobenzyl)-4-bromo-aminoacetanilide with a melting point of 152°–153° C was obtained.

EXAMPLE 5

2-(α-Morpholinobenzyl)-4-chloro-ω-aminoacetaminoacetanilide

A. To a mixture of 2-(α-morpholinobenzyl)-4-chloro-aminoacetanilide (4 g), ethyl-diisopropylamine (1.45 g), and chloroform (25 ml), a solution of phthaloylaminoacetyl chloride (2.5 g) in chloroform (10 ml) was added dropwise under continuous stirring. Stirring was continued till the next day, when water was added. The aqueous phase was repeatedly extracted with chloroform, and the combined chloroform extracts were dried over magnesium sulphate. The solvent was evaporated, and the residue was crystallized from methanol to give the 2-(α-morpholinobenzyl)-4-chloro-ω-phthaloylaminoacetaminoacetanilide with a melting point of 207° C.

B. 2-(α-Morpholinobenzyl)-4-chloro-ω-phthaloylaminoacetaminoacetanilide (3.8 g) and hydrazine hydrate (0.4 g) were dissolved in absolute ethanol (30 ml), and the solution was refluxed for 2 ½ hours. The reaction product was filtered hot, the filtrate was cooled, and the resulting precipitate was sucked off and purified by dissolving it in methylene chloride, filtering the solution and concentrating the filtrate. The resulting crystalline precipitate was recrystallized from ethanol to give the 2-(α-morpholinobenzyl)-4-chloro-ω-aminoacetaminoacetanilide with a melting point of 174°–176° C.

EXAMPLE 6

2-(Morpholinobenzyl)-4-chloro-ω-(N,N.diethylamino)-acetanilide

A. 5-Chloro-2-bromo-acetamino-benzophenone (15 g) was dissolved in dry diethylamine (20 ml). The mixture was boiled for 15 to 20 minutes and evaporated in vacuo. The residue was stirred with water (100 ml), and the crystalline product, which precipitated, was filtered off. After recrystallization from absolute ethanol (50 ml), the 5-chloro-2-diethylaminoacetamino-benzophenone was obtained with a melting point of 82°–83° C.

B. 5-Chloro-2-diethylaminoacetamino-benzophenone (20 g) was suspended in methanol (250 ml). While stirring and cooling, NaBH₄ (10 g) was added in small portions (the temperature not exceeding 40° C). The suspension was left at room temperature while stirring for 1 hour. Then water (100 ml) was added, and the crystalline product, which precipitated, was filtered off. After recrystallization from absolute ethanol (50 ml), the 5-chloro-2-diethylaminoacetamino-benzhydrol was obtained with a melting point of 131°–132° C.

C. 5-Chloro-2-diethylaminoacetamino-benzhydrol (5 g) was dissolved in ether (50 ml). Thionyl chloride (4.5 ml) dissolved in ether (25 ml) was added. The mixture was boiled for 0.5 hours and evaporated in vacuo. The residue was dissolved in acetone (10 to 15 ml). After a short time, the 2-(α-chloro-benzyl)-4-chloro-ω-(N,N-diethylamino)-acetanilide crystallized with a melting point of 185°–186° C.

D. Four g of the compound produced in step C was mixed with morpholine (2.6 g). The mixture was heated to 80° C for 15 minutes, and then stirred with water. The precipitate was filtered off and dissolved in ether. The ether phase was dried with CaCl₂, treated with charcoal and then evaporated in vacuo. The residue was stirred with petroleum ether (bp. 50° C) until crystallization. By recrystallization from small portions of ether, the 2-(α-morpholinobenzyl)-4-chloro-ω-(N,N-diethylamino)-acetanilide was obtained with a melting point of 85°–86° C.

By substituting methylamine, ethylamine, n-propylamine, or isopropylamine for the diethylamine used in step A, and following the procedure of Example 6, step A through D, the corresponding 2-(α-morpholinobenzyl)-4-chloro-ω-(N-methylamino)-acetanilide with a melting point of 133°–134° C, 2-(α-morpholinobenzyl)-4-chloro-ω-(N-ethylamino)-acetanilide with a melting point of 119°–120° C, 2-(α-morpholinobenzyl)-4-chloro-ω-(N-propylamino)-acetanilide with a melting point of 132°–133° C, or 2-(α-morpholinobenzyl)-4-chloro-ω-(N-iso-propylamino)-acetanilide with a melting point of 97°–98° C was obtained.

EXAMPLE 7

2-(α-Morpholinobenzyl)-4-chloro-ω-(N,N-dimethylamino)-acetanilide

5-Chloro-2-(bromo-acetamino)-benzophenone (15 g) was dissolved in benzene (100 ml). Dimethylamine in benzene (100 ml 30 percent) was added, and the mixture was heated for 3 hours in a sealed flask (81°–85° C). The benzene phase was shaken with water in order to extract excess dimethylamine. The benzene phase was then shaken with dilute hydrochloric acid, and the aqueous phase was isolated and neutralized with dilute potassium hydroxide whereby a precipitate was formed. The crystalline product was filtered off and recrystallized from absolute ethanol (25 ml), yielding 5-chloro-2-ω-(N,N-dimethylamino)-benzophenone with a melting point of 121°–122° C. This substance (12 g) was dissolved in methanol (200 ml), and NaBH$_4$ (10 g) was added with stirring and cooling. After 1.5 hours at room temperature with stirring, water (250 ml) was added, and the formed precipitate was filtered off. This benzhydrol was dissolved in chloroform (100 ml), and thionyl chloride (10 ml) was added. The mixture was boiled for 0.5 hours and evaporated in vacuo. The semi-crystalline residue was dissolved in morpholine (20 ml) and heated to 80° C for 0.5 hours and evaporated in vacuo. The residue was stirred with water, and the resulting precipitate was filtered off, dissolved in ether, and treated with charcoal and evaporated in vacuo. The residue was recrystallized from petroleum ether. The crystalline 2-(α-morpholinobenzyl)-4-chloro-ω-(N,N-dimethylamino)-acetanilide had a melting point of 140°–141° C.

By substituting 2-(bromo-acetamino)-5-bromo-benzophenone, or 2-(bromo-acetamino)-5-nitro-benzophenone for the 2-(bromo-acetamino)-5-chloro-benzophenone and following the procedure of Example 7, the corresponding 2-(α-morpholinobenzyl)-4-bromo-ω-(N,N-dimethylamino)-acetanilide with a melting point of 115°–116° C, or 2-(α-morpholinobenzyl)-4-nitro-ω-(N,N-dimethylamino)-acetanilide with a melting point of 157°–158° C was obtained.

EXAMPLE 8

2-(α-Morpholinobenzyl)-4-chloro-ω-pyrrolidino-acetanilide

5-Chloro-2-(bromo-acetamino)-benzophenone (10 g) was dissolved in pyrrolidine (10 ml) and heated to 75°–80° C for 2 hours. The reaction mixture was evaporated in vacuo, stirred with water, and recrystallized from ethanol. Thereby 5-chloro-2-ω-(pyrrolidinoacetamino)-benzophenone with a melting point of 172°–173° C was obtained. By treating this compound with NaBH$_4$ in methanol as described in Example 7, 5-chloro-2-(-pyrrolidinoacetamino)-benzhydrol was obtained as an oil. 5-Chloro-2-ω-(pyrrolidinoacetamino)-benzhydrol (7.3 g) was dissolved in chloroform (50 ml). A solution of thionyl chloride (2.5 g) in chloroform (15 ml) was added dropwise while cooling with ice. The mixture was left at room temperature for 5 hours, when it was refluxed for 40 minutes. The solution was evaporated in vacuo to one-third volume, and the crystalline precipitate was filtered off. The resulting 2-(α-chloro-benzyl)-4-chloro-pyrrolidinoacetanilide hydrochloride had a melting point of 216°–218° C.

7.3 g of the above compound were dissolved in morpholine (20 ml). After the exothermic reaction had ceased, the mixture was left at room temperature for 10 hours and then evaporated in vacuo. The residue was stirred with water (50 ml) whereby a precipitate formed, which was dissolved in ether. The ether phase was dried with CaCl$_2$ and evaporated. The residue was recrystallized from ether/petroleum ether (1:1), whereby a-(α-morpholinobenzyl)-4-chloro-ω-pyrrolidino-acetanilide was obtained with a melting point of 142°–143° C.

By substituting 2-(bromo-acetamino)-5-nitro-benzophenone for the 2-(bromo-acetamino)-5-chloro-benzophenone of Example 8 and using the procedure described in that Example, 2-(α-morpholinobenzyl)-4-nitro-ω-pyrrolidinoacetanilide was obtained with a melting point of 173°–174° C. By substituting piperidine, aziridine, 4-methylpiperidine, or N-methylpiperazine for the pyrrolidine, and using the procedure of the previous Example, 2-(α-morpholinobenzyl)-4-nitro-ω-piperidino-acetanilide with a melting point of 167°–168° C, 2-(α-morpholinobenzyl)-4-nitro-ω-aziridinoacetanilide with a melting point of 165°–166° C, 2-(α-morpholinobenzyl)-4-nitro-ω-(4-methylpiperidino)-acetanilide with a melting point of 114°–115° C, or 2-(α-morpholinobenzyl)-4-nitro-ω-(4-methylpiperazino)-acetanilide with a melting point of 147°–148° C was obtained.

EXAMPLE 9

2-(α-Morpholinobenzyl)-4-chloro-ω-aminoacetanilide Dihydrochloride

A. 5Chloro-2-benzoylamino-benzophenone (100 g) was suspended in methanol (1 liter). While stirring and cooling with ice, NaBH$_4$ (55 g) was slowly added whereby a clear solution was formed. The solution was left for 2 hours with stirring, and water (500 ml) was added. The resulting crystalline precipitate was filtered off, washed with water, and dried. The 2-benzoylamino-5-chloro-benzhydrol was obtained with a melting point of 153°–154° C.

B. 2-Benzoylamino-5-chloro-benzhydrol (20, 1 g) was dissolved in chloroform (100 ml). Thionyl chloride (7.1 g) was added dropwise while cooling, and the mixture was left at room temperature for 0.5 hours, when it was refluxed for 1 hour. The solution was evaporated in vacuo at a maximum temperature of 30° C. The residue was recrystallized from ethanol (50 ml). The 2,4-diphenyl-6-chloro-3,1,4-benzoxazine was obtained with a melting point of 117°–118° C.

In the above reaction, other dehydrating agents, such as sulphuric acid, phosphorous pentachloride, and boron trifluoride can be used.

C. The above prepared oxazine (20 g) was dissolved in morpholine (30 ml) and boiled for 10 hours. The solution was mixed with cold water, and the crystalline precipitate was filtered off. After recrystallization from isopropanol or absolute ethanol, the 2-(α-morpholinobenzyl)-4-chlorobenzanilide had a melting point of 173°–174° C.

D. 2-(α-Morpholinobenzyl)-4-chloro-benzanilide (20 g) was dissolved in methanol (500 ml 80 percent), and potassium hydroxide was added. The mixture was boiled for 15 hours, whereafter the methanol was distilled off, leaving an oil which was extracted with ether. The ether phase was dried and evaporated to a small volume whereby a crystalline precipitate was formed. After recrystallization from small quantities of ether, the 2-(α-morpholinobenzyl)-4-chloroaniline had a melting point of 113°–114° C.

E. 2-(α-Morpholinobenzyl)-4-chloro-aniline (15 g) was dissolved in ether (500 ml), and pyridine (10 ml) was added. A solution of bromo-acetyl bromide (16 g) in ether (50 ml) was added dropwise with stirring. The mixture was left at room temperature for 1 hour and washed with water (250 ml). The ether phase was dried and evaporated to one-third volume. After recrystallization, the 2-(α-morpholinobenzyl)-4-chloro-ω-bromoacetanilide had a melting point of 131°–132° C.

F. The bromo-acetyl compound (2.1 g) was stirred for 15 hours in ammonia in ethanol (75 ml) and evaporated until dryness. The residue was boiled with dioxane (25–30 ml), and the precipitated ammonium bromide was filtered off. The dioxane phase was evaporated, and the residue was dissolved in absolute ethanol (10 ml), after which dry hydrogen chloride was added. After recrystallization from ethanol, the 2-(α-morpholinobenzyl)-4-chloro-ω-aminoacetanilide dihydrochloride had a melting point of 205°–216° C.

EXAMPLE 10

2-(α-Morpholinobenzyl)-4-chloro-ω-N-methylaminoacetanilide

The bromo-acetyl compound of Example 9 E (2.1 g) was mixed with methylamine (50 ml 33 percent) in water. Ethanol (50 ml) was added, and the mixture was left while stirring for 15 hours. After evaporation in vacuo, the residue was stirred with water and filtered. After recrystallization from ethanol, the compound had a melting point of 133°–134° C.

By substituting dimethylamine, diethylamine, sec. butylamine, isobutylamine, benzylamino, N-methyl-N-cyclohexylamine, or dimethylaminoethylamine for the methylamine used in Example 10 and following the described procedure, the corresponding 2-(α-morpholinobenzyl)-4-chloro-ω-(N,N-dimethylamino)-acetanilide with a melting point of 140°-141° C, 2-(α-morpholinobenzyl)-4-chloro-ω-(N,N-diethylamino)-acetanilide with a melting point of 85°-86° C, 2-(α-morpholinobenzyl)-4-chloro-ω-(N-sec.butylamino)-acetanilide with a melting point of 131°-133° C, 2-(α-morpholinobenzyl)-4-chloro-ω-(N-iso-butylamino)-acetanilide with a melting point of 123°-125° C, 2-(α-morpholinobenzyl)-4-chloro-ω-(N-benzylamino)-acetanilide with a melting point of 150°-151° C, 2-(α-morpholinobenzyl)-4-chloro-ω-(N-methyl,N-cyclohexylamino)-acetanilide with a melting point of 130°-131° C, or 2-(α-morpholinobenzyl)-4-chloro-ω-(N-dimethylaminoethylamino-acetanilide with a melting point of 109°-110° C was obtained.

EXAMPLE 11

2-(α-Morpholino-2'-fluorobenzyl)-4chloro-N-o-fluorobenzaniline

A. o-Fluorobenzoyl chloride (220 g) was heated to about 170° C, and p-chloro-anilide (80 g) was slowly added within 15 minutes under continuous stirring and thereafter anhydrous zinc chloride (87 g). The temperature was raised to 200°-205° C, and this temperature was maintained for 2 hours. The mixture was cooled to 160° C, and 4N hydrochloric acid (500 ml) was added, whereafter the mixture was refluxed with stirring for 15 minutes. The oily phase was separated and repeatedly boiled with 4N hydrochloric acid. Then the oily phase was poured on ice, and the precipitate was filtered off, pulverized, and boiled three times with acetone, whereby the crystalline 2,4-di-o-fluorophenyl-3-p-chlorophenyl-3,4-dihydro-6-chloro-quinazoline was obtained with a melting point of 240°-241° C.

This product was boiled for some hours with one equivalent of concentrated hydrochloric acid in ethanol. The ethanol was then evaporated, and the residue was poured into water, whereby a precipitate was obtained, which after recrystallization from ethanol had a melting point of 157°-158° C. From the combined ether-phases above (3 liter), a second crop of the same product was obtained after washing with 2N sodium hydroxide, drying with magnesium sulphate, filtering through charcoal, evaporating the ether, and recrystallizing the residue from ethanol, also with a melting point of 157°-158° C.

B. The substituted benzoylamino-benzophenone obtained above (10 g) was suspended in ethanol (absolute, 100 ml), and sodium borohydride (2 g) was added. The mixture was left under continuous stirring for 2 hours at room temperature, when the reaction product was precipitated by addition of water. After recrystallization, the desired product was obtained with a melting point of 114°-115° C.

C. The benzhydrol obtained in step B (10.2 g) was dissolved in methylene chloride (100 ml), and thionyl chloride (3.6 g) was added. The mixture was refluxed for 40 minutes, cooled, and then shaken with sodium bicarbonate. The methylene chloride phase was dried over magnesium sulphate and evaporated to dryness. After recrystallization from ether, the product was obtained with a melting point of 121°-122° C.

D. The benzhydryl chloride obtained in step C (2 g) was boiled for 5 minutes with morpholine (5 ml), whereafter it was poured into water (100 ml) while stirring. The resulting precipitate was sucked off and was recrystallized from absolute ethanol, whereby the desired compound was obtained with a melting point of 136°-137° C.

By subjecting this compound to an acid hydrolysis, 2-(α-morpholino-2'-fluorobenzyl)-4-chloroaniline with a melting point of 135°-136° C was obtained.

Following the procedure described in step A, but substituting one equivalent of p-nitro-aniline for the p1-chloro-aniline used, the corresponding 5-nitro-2'-fluoro-2-(o-fluorobenzoylamino)-benzophenone with a melting point of 212°-214° C was obtained, and substituting o-chlorobenzoyl chloride for the o-fluorobenzoyl chloride used, the corresponding 5-nitro-2'-chloro-2-(o-chlorobenzoylamino)-benzophenone with a melting point of 175°-177° C was obtained. Substituting benzoyl chloride for the o-fluorobenzoyl chloride, and p-nitro-aniline for the p-chloro-aniline used in step A, the corresponding 5-nitro-2-(benzoylamino)-benzophenone was obtained with a melting point of 183°-185° C.

Following the procedure in step B above and using the benzophenones mentioned above, the corresponding 5-nitro-2'-fluoro-2-(o-fluorobenzoylamino)-benzhydrol with a melting point of 140°-141° C, the 5-nitro-2'-chloro-2-(o-chlorobenzoylamino)-benzhydrol, and the 5-nitro-2-(benzoylamino)-benzhydrol with a melting point of 160°-161° C was obtained.

Following the procedure described in step C and D above and substituting 5-nitro-2'-fluoro-(o-fluorobenzoylamino)-benzhydrol or 5-nitro-2'-chloro-2-(o-chlorobenzoylamino)-benzhydrol for the benzhydrol used, the corresponding 2-(α-morpholino-2'-fluorobenzyl)-4-nitro-N-o-fluorobenzaniline with a melting point of 162°-163° C or the 2-(α-morpholino-2'-chlorobenzyl)-4-nitro-N-o-chlorobenzaniline was obtained.

The compounds of this example were subjected to an acid hydrolysis whereby 2-(α-morpholino-2'-fluorobenzyl)-4-nitroaniline and 2-(α-morpholino-2'-chlorobenzyl)-4-nitroaniline were obtained with melting points of 154°-155° C and 137°-138° C, respectively.

As examples of dosage units, the prescriptions below describe the preparation of suitable tablets containing each 10 mg of the active component.

Ingredients:

A: 2-(α-morpholino-2'-fluorobenzyl)-
4-nitro-ω-allylamino-acetanilide         30 g
Corn starch                              240 g
Lactose                                  240 g A mixture of these ingredients was granulated with the necessary amount of a 5 percent gelating solution, dried and screened. The granulate was mixed with 30 g of talc and was compressed to tablets of 180 mg each, yielding 3,000 tablets, each containing 10 mg of the active substance.

Ingredients:

B: 2-(α-morpholino-2'-fluorobenzyl)-
4-chloro-aminoacetanilide                50 g
Lactose                                  675 g A mixture of these ingredients was granulated with a 10 percent starch solution, dried and screened. The granulate was mixed with 40 g of talc and was compressed to tablets of 150 mg each, yielding 5,000 tablets, each containing 10 mg of the active substance.

By one of the methods described in the foregoing Examples, the compounds of Table I within the scope of formula I were synthesized. X, Y, R¹ and R² of formula I have the meaning defined in the columns in which also the melting points of the compounds are given.

TABLE I

| X | Y | R¹ | R² | M.p. in °C |
|---|---|----|----|------------|
| Cl | F | H | —CH₂CH₂OC₂H₅ | 93-94 |
| Cl | F | H | —CH₂CH = CH₂ | 89-90 |
| Cl | F | H | —CH₂CH₂N(C₂H₅)₂ | 103-104 |
| Cl | F | H | —C₂H₅ | 118-119 |
| Cl | F | H | —n—C₃H₇ | 115-116 |
| Cl | F | H | —iso—C₃H₇ | 147-148 |
| Cl | F | H | —n—C₇H₁₅ | 76-77 |
| Cl | F | —C₂H₅ | —C₂H₅ | 93-94 |
| Cl | H | H | —CH₂C₆H₅ | 150-151 |
| NO₂ | F | H | —CH₂CH = CH₂ | 122-123 |
| NO₂ | F | H | —iso—C₃H₇ | 180-181 |
| NO₂ | F | H | —C₂H₅ | 158-159 |

| | | | | |
|---|---|---|---|---|
| F H | | —C₂H₅ | —C₂H₅ | 90–91 |
| F F | H | | —iso—C₃H₇ | 135–136 |
| Cl Cl | H | | —n—C₃H₇ | 123–124 |
| Cl Cl | H | | —CH₂CH=CH₂ | 137–138 |
| Br H | H | | —C₂H₅ | 113–114 |
| Br H | H | | —iso—C₃H₇ | 118–119 |
| Br H | | —CH₃ | —CH₃ | 115–116 |
| Br H | H | | —n—C₃H₇ | 134–135 |
| Br H | H | | —CH₂CH₂OH | 112–114 |
| Br H | H | | —CH₂CH₂CH₂OH | 119–121 |
| Br H | H | | —C(CH₃)₂CH₂OH | 121–122 |
| NO₂ H | | —CH₃ | —CH₃ | 157–158 |
| NO₂ H | | —C₂H₅ | —C₂H₅ | 139–140 |
| NO₂ H | H | | —iso—C₃H₇ | 145–146 |
| NO₂ H | H | | —C₂H₅ | 145–146 |
| NO₂ H | H | | —CH₂CH₂CH₂OCH₃ | 144–145 |
| NO₂ H | H | | —CH₂CH₂CH₂OC₂H₅ | 108–109 |
| NO₂ H | H | | —CH₂CH(OC₂H₅)₂ | 89–90 |
| | | | —CH₂—⟨furan⟩ | |
| | | | —CH₂—⟨furan⟩ | |
| NO₂ H | H | | —CH₂CH=CH₂ | 150–151 |
| NO₂ H | H | | —CH₂CH₂C₆H₅ | 133–134 |
| | | | —CH₂CHCH₃<br>   OCH₃ | |

We claim:

1. 2-(α-Morpholinobenzyl)-4-nitro-aminoacetanilide.
2. 2-(α-Morpholinobenzyl)-4-chloro-aminoacetanilide.
3. 2-(α-Morpholino-2'-fluorobenzyl)-4-chloro-aminoacetanilide.
4. 2-(α-Morpholino-2'-fluorobenzyl)-4-nitro-ethylaminoacetanilide.
5. 2-(α-Morpholino-2'-fluorobenzyl)-4-nitro-ω-allylamino-acetanilide.
6. A 2-(α-morpholino-benzyl)-anilide compound of the formula

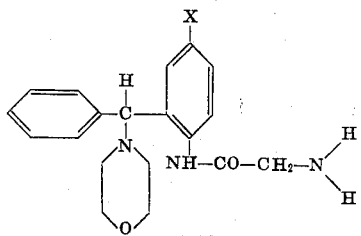

wherein X is halo.

7. A 2-(α-morpholino-benzyl)-anilde compound of the formula

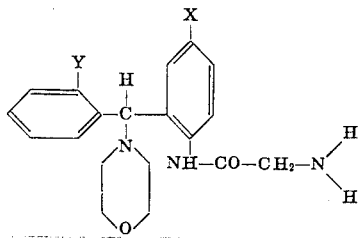

wherein X and Y are halo.

8. A 2-(α-morpholino-benzyl)-anilde compound of the formula

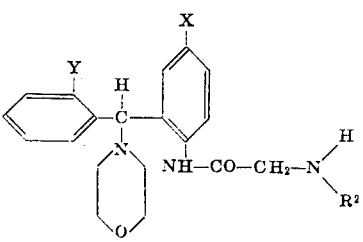

wherein X is nitro, Y is halo and R² is alkyl having a maximum of seven carbon atoms.

9. A 2-(α-morpholino-benzyl)-anilide compound of the formula

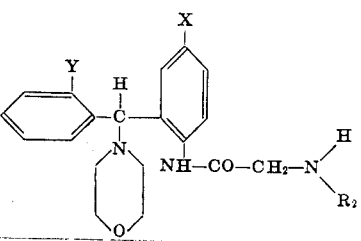

wherein X is nitro, Y is halo and R² is alkenyl having a maximum of seven carbon atoms.

* * * * *